United States Patent

[11] 3,581,236

[72] Inventor Leon Berman
Asnieres, France
[21] Appl. No. 789,540
[22] Filed Jan. 7, 1969
[45] Patented May 25, 1971
[73] Assignee C.I.T. Compagnie, Industrielle Des Telecommunications
Paris, France
[32] Priority Jan. 8, 1968
[33] France
[31] 135,225

[54] HIGH STABILITY OSCILLATOR
5 Claims, 3 Drawing Figs.

[52] U.S. Cl. .......... 331/116, 331/159, 331/176, 334/15
[51] Int. Cl. .......... H03b 5/36
[50] Field of Search .......... 331/116, 159, 176; 334/15; 332/26

[56] References Cited

UNITED STATES PATENTS

| | | | |
|---|---|---|---|
| 2,660,680 | 11/1953 | Koerner .......... | 331/159 |
| 2,683,252 | 7/1954 | Gordon .......... | 332/26 |
| 3,428,916 | 2/1969 | Hovenga et al. .......... | 331/116 |

OTHER REFERENCES

Wright Report 54–248, Dec. 1954, Pg. 393, 331–159

*Primary Examiner*—John Kominski
*Attorney*—Craig, Antonelli, Stewart & Hill

ABSTRACT: A high stability oscillator having an amplifying channel including a phase adjusting member and a separate reaction channel including a resonant crystal and a temperature stabilizing circuit, the phase adjusting member being effective to compensate for aging of the crystal without affecting the temperature stabilization of the oscillator.

HIGH STABILITY OSCILLATOR

The invention relates to a circuit permitting manual frequency correction in an oscillator equipped with automatic compensation for the effects of temperature.

A high-stability oscillator, even when equipped with a resonant circuit which is only slightly affected by temperature deviations, nevertheless requires some form of compensating action to achieve the maximum degree of stabilization of which a quartz crystal resonator is capable. In general, the resonator used in these arrangements is a quartz crystal cut in an appropriate direction.

There exist two means of heat stabilization at the disposal of the manufacturer of high-stability oscillators.

1. Placing the oscillator in an oven, providing a constant temperature, the classic solution which has given rise to numerous constructions; its disadvantage is the space required and the consumption of energy for heating the oven.
2. In modern technology, it is preferred to solve the problem of temperature stability by switching in a capacitance element having variable characteristics, such as a varactor, or a variable capacity diode, controlled by a heat-sensitive member, such as a thermistor. The voltage applied to the variable capacity diode is automatically adjusted by an associated network, containing one or more thermistors, so as to compensate for the major part of the residual heat deviation.

This last method is today the favorite solution. It eliminates the space required for the oven and, moreover, only requires for the control of the network of thermistors, a power of a few tens of milliwatts which is much less than the power needed by the smallest oven.

However, heat deviations are not the only deviations which can affect the frequency of a quartz oscillator. It is well known that a quartz crystal does not remain indefinitely the same, but undergoes with time an aging, the effects of which exceed the allowable variation for a high-stability oscillator. The effect of the aging is that the long term stability is no longer at the same frequency level as the short term stability. To compensate for the effects of aging, it is known to incorporate in the quartz resonator circuit of the oscillator a small, adjustable capacitance which permits adjustment of the frequency shift produced by the aging, at infrequent intervals.

But here one encounters a difficulty. A given quartz resonator circuit exhibits a certain law of impedance variation as a function of temperature:

$$\Delta Z = f(t)$$

In fact the function $f(t)$ includes as a parameter the value of the actual capacitance to be corrected. If then the impedance taken at a comparison temperature, for example 20° C, is $Z_o$, one must propound:

$$\Delta Z = \gamma(Z_o, t),$$

where $\gamma$ is a constant.

The heat correction network, in fact a network of thermistors and resistances, is so formed and dimensioned that it compensates for any change in impedance produced by a change in temperature, by introducing a term $\Delta Z'$ where:

$$\Delta Z' \Upsilon X \gamma'(Z_o, t), \text{ with } \gamma' = -\gamma.$$

In this way one has:

$$\Delta Z' = -\Delta,$$

and the resulting changes in impedance of the two capacitances produced by the effects of temperature are offsetting. The desired compensation of the heat effect is thereby obtained.

But if, to compensate for aging, one readjusts the capacitor provided for this purpose, one alters $Z_o$, which then becomes equal to $Z_1$. The effective capacity of the quartz crystal now varies according to the law:

$$\Delta Z = \gamma(Z_1, t).$$

However, the variable capacity diode always varies according to the law which has been imposed on it by construction:

$$Z' - \gamma'(Z_o, t),$$

so that the compensation no longer functions in a satisfactory way, as one no longer has $\Delta Z' = \Delta Z$.

An object of the invention is the provision of an improved high-stability oscillator.

In accordance with the present invention an oscillator includes an amplifying channel $\mu$ and a reaction channel $\beta$, one of such channels containing a temperature stabilized resonator circuit and the other channel containing a phase changing element for altering the transfer constant of the channel. The temperature stabilized resonator circuit suitably comprises a quartz resonator and a device whose capacitance varies with an applied voltage determined by a temperature compensating network having at least one thermistor.

The invention has the advantage that it is able to provide a quartz oscillator circuit or similar high-stability circuit in which the correction for the effects of aging of the quartz crystal or other resonator does not deteriorate the quality of the heat compensation which is achievable by using a variable capacity diode or varactor controlled by a suitable temperature compensating network.

The invention is based on the concept of constructing an oscillator as a reaction-loop amplifier, that is to say, providing the oscillator with an amplifying channel, called channel $\mu$, and a reaction channel called channel $\beta$. It is known that any oscillator can normally be reduced to a concept of this kind, and that the frequency over which an oscillator functions is that for which there exists a dephasing of 180° between two terminals of the channel $\mu$.

The phase changing element is suitably a variable capacitance and may be incorporated into channel $\mu$. One form of phase changing network takes the form of an RC circuit having an adjustable capacitor. The reaction channel $\beta$ then contains the temperature stabilized resonator circuit. In practice the resonator is preferably placed in the network $\gamma$.

The invention will now be described in more detail, by way of example, with reference to the accompanying drawings, in which.

Figure 1:
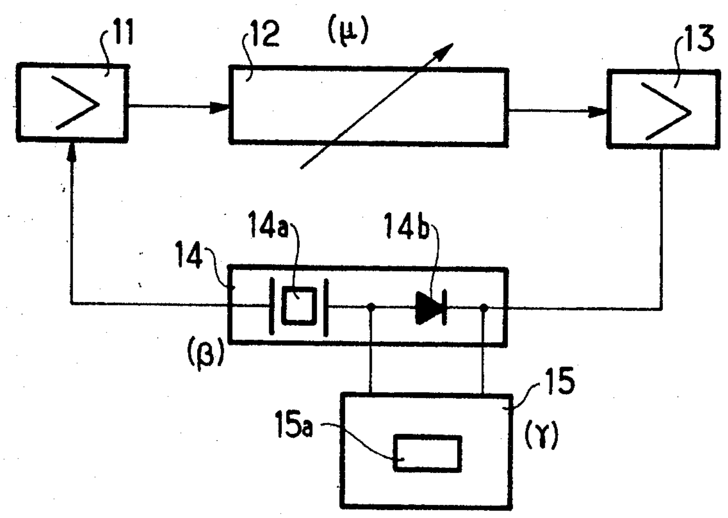
FIG. 1 is a schematic block diagram showing the basic principle of the invention.

In FIG. 1 is seen at 11 and 13 two amplifying members, which may be formed by tubes or transistors, connected by an adjustable channel 12 ($\mu$), the adjustment being effected by at least one variable reactance component, such as a capacitor and causing the phase of the transfer constant of the channel $\mu$ to vary. The member 13 is also connected back to the member 11 by way of a reaction channel 14 ($\beta$) which comprises essentially a quartz resonator **14*a* in series with a variable capacity diode 14*b*. The diode receives a control voltage from a temperature compensating network ($\gamma$) which contains at least one thermistor 15*a***.

Adjustment of the variable capacitor of the channel 12 causes its dephasing effect to vary and in consequence the frequency for which the phase opposition indicated above, that is to say the oscillation frequency, also varies slightly. However, the configuration of the channel 12 ($\mu$) is not altered, so that the heat compensation regulated at the outset is integrally maintained. One thus can correct the oscillator for aging without deteriorating the heat compensation of the resonator.

Figure 2:
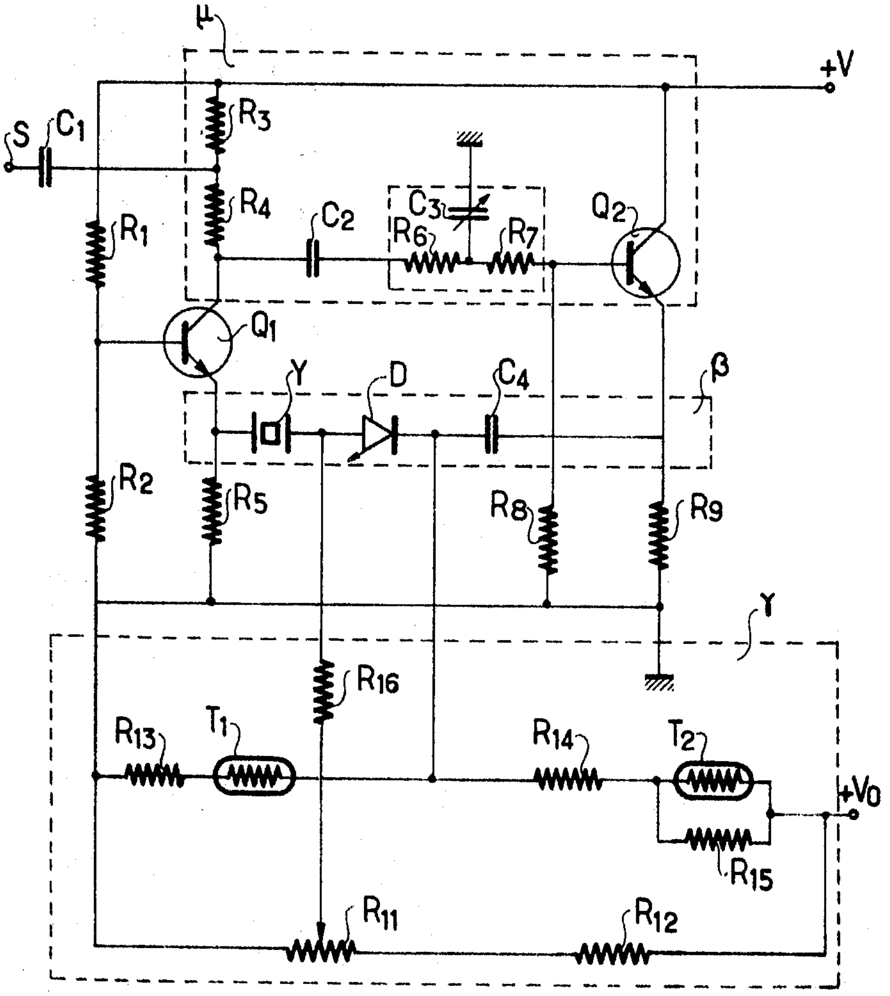
FIG. 2 is a circuit diagram of the oscillator shown diagrammatically in FIG. 1.

In FIG. 2, the amplifying members 11 and 13 are transistors $Q_1$ and $Q_2$, supplied by a DC voltage source +V. The base of $Q_1$ is biased by a potential divider formed by resistances $R_1$ and $R_2$. Its collector circuit includes two resistances in series $R_3$, $R_4$, and its emitter circuit includes a resistance $R_5$. The transistor $Q_1$ is excited by its emitter.

The transistor $Q_2$ has its collector connected to the voltage +V and its emitter is connected to ground through a resistance $R_9$.

The collector of transistor $Q_1$ is connected to to the base of transistor $Q_2$ by a channel $\mu$ comprising a capacitor $C_2$, two resistances in series $R_6$, $R_7$, and a resistance $R_8$ connected between the base of transistor $Q_2$ and ground. Between the point common to resistance $R_6$ and $R_7$ and ground is connected an adjustable capacitor $C_3$.

The emitter of transistor $Q_2$ is connected to the emitter of transistor $Q_1$ through a channel $\beta$ comprising a capacitor $C_4$, a variable capacity diode D and a quartz crystal resonator Y.

The output frequency is extracted at the point S by way of a capacitor $C_1$.

The variable capacity diode D receives a control voltage from a parallel network $\gamma$ which has one branch containing a potentiometer $R_{11}$ and a resistance $R_{12}$ in series, and a second branch containing a thermistor $T_1$ in series with a resistance $R_{13}$, and a resistance $R_{14}$ in series with a parallel circuit formed by a thermistor $R_2$, and a resistance $R_{15}$. Between the slider of potentiometer $R_{11}$ and the anode of the variable capacity diode D is connected a resistance $R_{16}$. The other terminal or cathode of the variable capacity diode D is connected directly to the point of connection of thermistor $T_1$ and resistance $R_{14}$. The network $\gamma$ is supplied with a stabilized voltage $+V_o$. In operation of the current of FIG. 2, the frequency of the oscillator is determined by the resonant frequency of the reaction channel $\beta$, which can be varied by varying the capacitance of diode D. For this purpose, each side of the diode D is connected to a respective branch of the temperature compensating network, one branch including the thermistors $T_1$ and $T_2$ providing for automatic temperature control and the other branch including potentiometer $R_{11}$ providing for manual frequency selection. Since the two branches of network $\gamma$ are essentially voltage divider networks connected in parallel with the bias voltage $+V_0$, variation of either $R_{11}$ or the thermistors $T_1$ and $T_2$ by temperature change, or both, will result in variation of the voltage applied across diode D and consequently vary the frequency of the oscillator.

As indicated hereinabove, the amplifying channel $\mu$ also affects the frequency of the oscillator by controlling the phase of the signal applied from the collector of transistor $Q_1$ to the base of transistor $Q_2$. As is well known, the frequency of an oscillator is that for which 180° phase shift is provided between output and input, i.e., the oscillator will lock in where a full reinforcement of the signal is obtained at the input. Thus, the amplifying channel is used in accordance with the invention to vary the frequency of the oscillator, but since this circuit is separate from the circuits $\beta$ and $\gamma$, it will operate independently from these currents.

Figure 3:
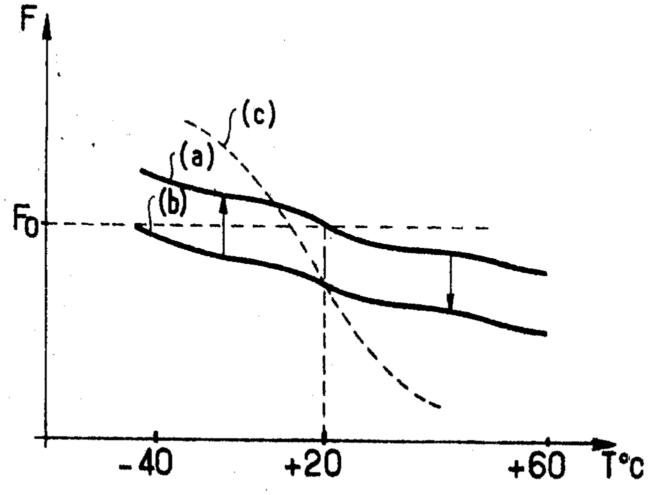
FIG. 3 is a graph showing the effect of aging on a resonator quartz.

In FIG. 3 is seen at (*a*) a curve of the residual variations of frequency as a function of temperature, between −40° C and +60° C. It is supposed that the oscillator has been regulated at the nominal frequency $F_o$ at a temperature of 20° C. At the outset the oscillator has the nominal frequency $F_o$ at +20° C, and shifts in frequency slightly (a fraction of 10'7 per degree) on either side of 20° C. At the end of several months of functioning, the quartz having aged, the curve has been transferred to a new position (*b*) shown below the original position (*a*). By readjusting the capacitor $C_3$ of FIG. 2, the curve can be brought back to its original value.

If the solution of the invention set out above is not adopted, and instead a readjustment of a capacitor directly associated with the quartz crystal takes place, a correction curve of the kind shown at (*c*) results and from which it is seen that the quality of the heat correction is seriously compromised.

I have shown and described an embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

I claim:

1. A high stability oscillator comprising:

first and second amplifiers each having an input circuit and an output circuit;

a reactor channel including a temperature stabilized resonator circuit connected between the output circuit of said second amplifier and the input circuit of said first amplifier, said resonator circuit comprising a quartz crystal connected in series with a variable capacity diode, said variable capacity diode being connected to a temperature compensating network for controlling the capacitance of said diode, said network including at least one thermistor connected between a voltage source and said diode, whereby changes in the temperature of said thermistor introduce corresponding changes in the capacitance of said diode; and means for adjusting the frequency of the oscillator due to aging of said crystal, comprising a variable phase shifting circuit connected between the output of said first amplifier and the input of said second amplifier, whereby, in response to the aging of said crystal, the operation of said temperature stabilized resonator, in maintaining the frequency of said oscillator constant, may be insured through the adjustment of said variable phase shifting network.

2. A high stability oscillator, according to claim 1, wherein said first amplifier comprises a first transistor, the emitter of which is connected to said resonator circuit, and the collector of which is connected to said frequency adjusting means and wherein said second amplifier comprises a second transistor, the base of which is connected to said frequency adjusting means, and the emitter of which is connected to said resonator circuit.

3. A high stability oscillator, according to claim 1, wherein said temperature compensating network includes a pair of thermistors connected in series with a potentiometer, the variable arm of which is connected to one side of said diode, while the other side of said diode is connected directly to one of said thermistors.

4. An oscillator as claimed in claim 1, in which the phase changing element comprises an RC network equipped with an adjustable capacitor.

5. A high stability oscillator as defined in claim 1, wherein said first and second amplifiers are first and second transistors, respectively, said second transistor being connected in emitter follower configuration.